No. 739,475. PATENTED SEPT. 22, 1903.
A. BARR & W. STROUD.
RANGE FINDER OR TELEMETER.
APPLICATION FILED MAR. 19, 1903.
NO MODEL. 5 SHEETS—SHEET 2.
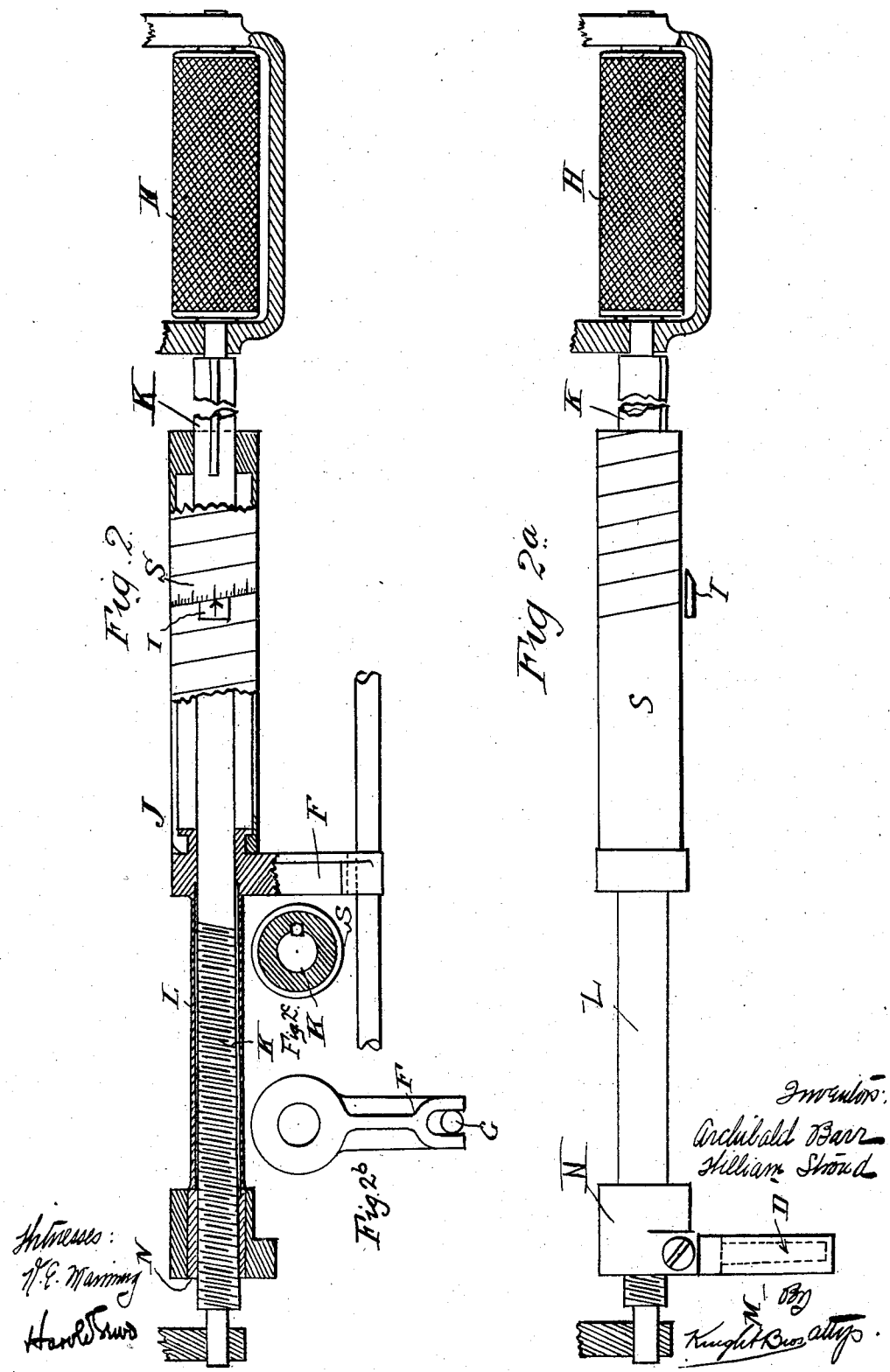

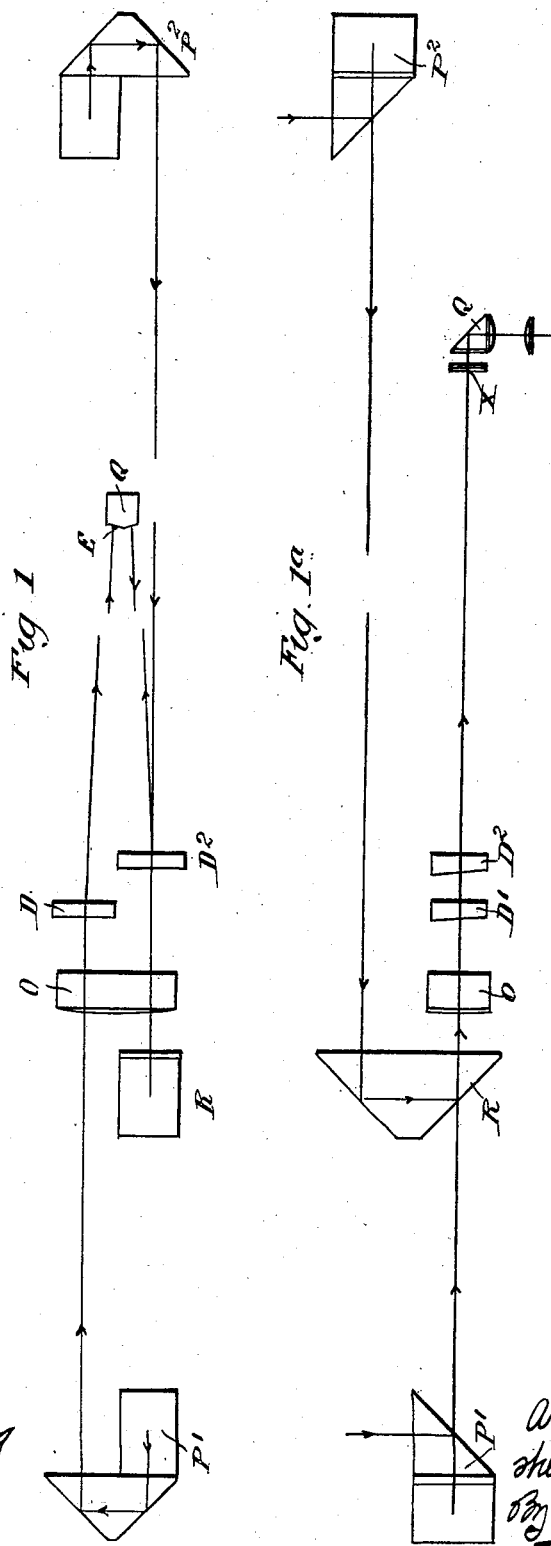

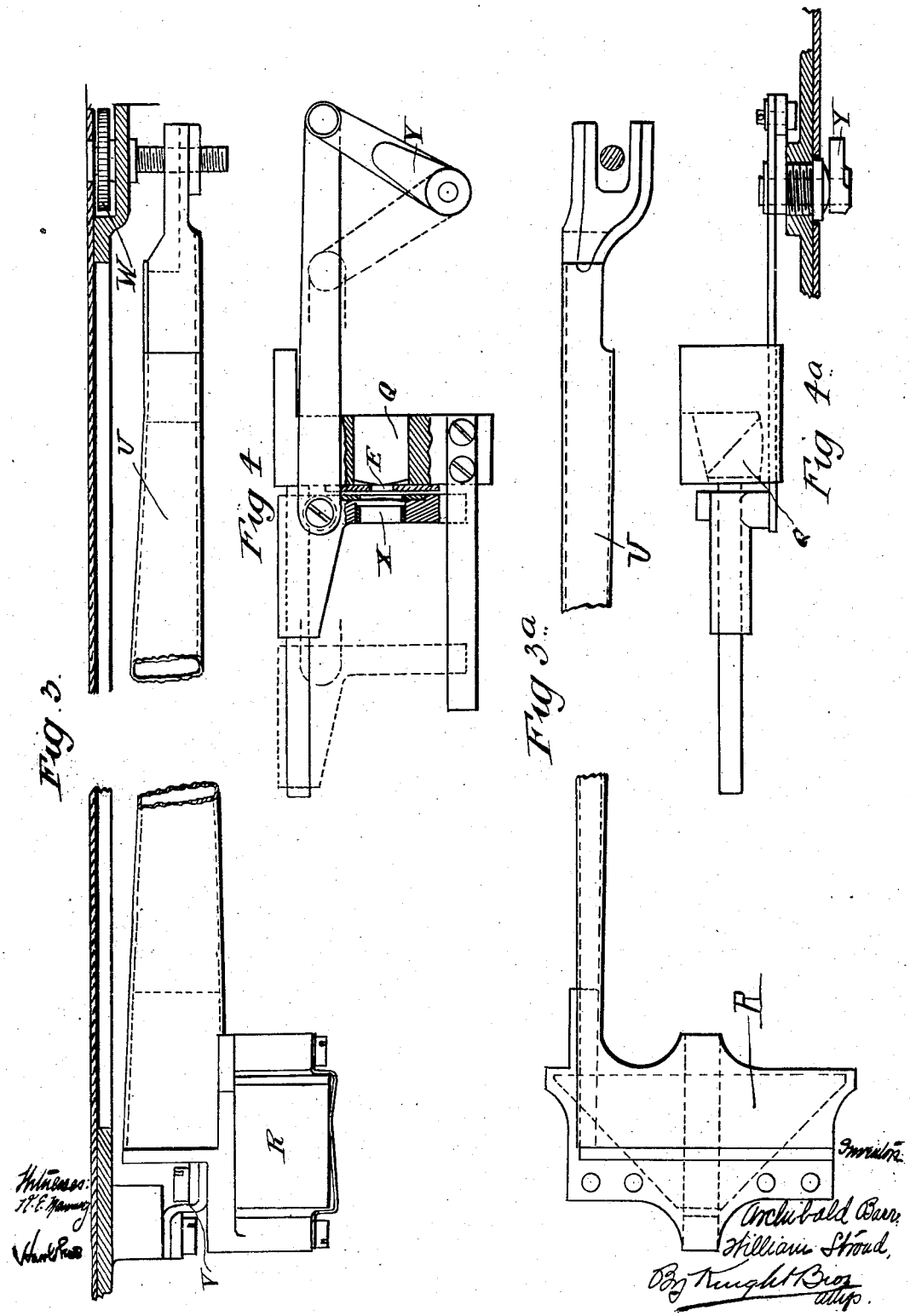

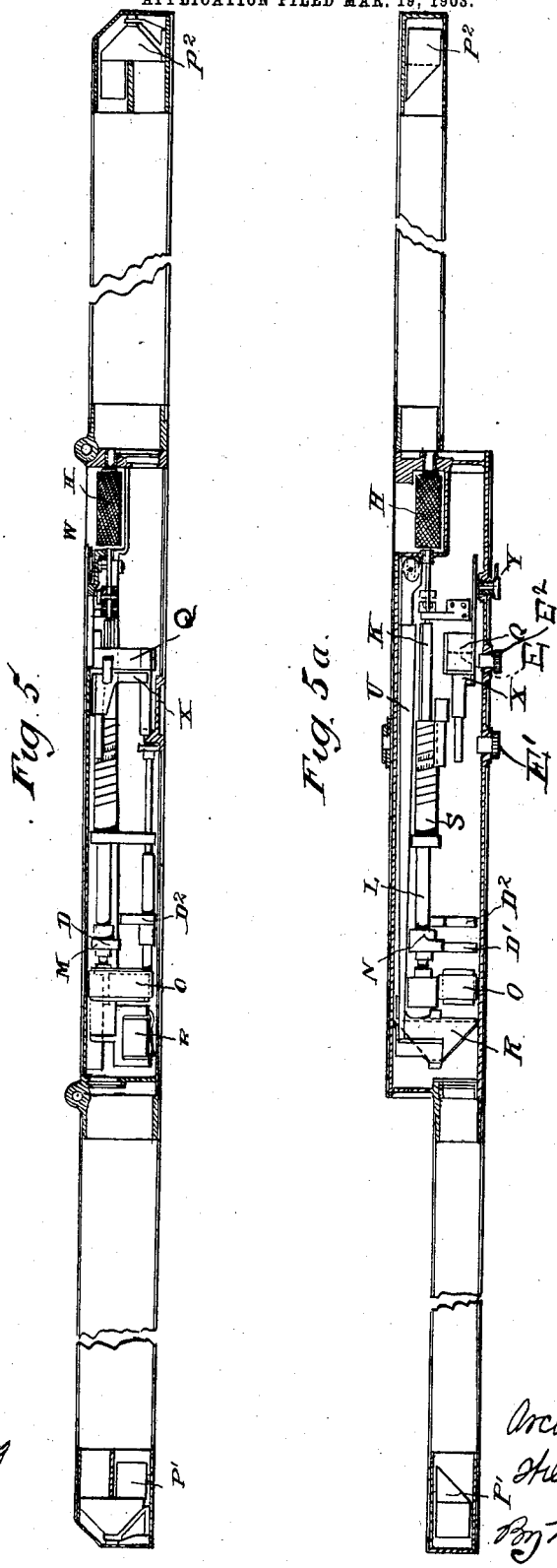

No. 739,475. PATENTED SEPT. 22, 1903.
A. BARR & W. STROUD.
RANGE FINDER OR TELEMETER.
APPLICATION FILED MAR. 19, 1903.
NO MODEL. 5 SHEETS—SHEET 5.
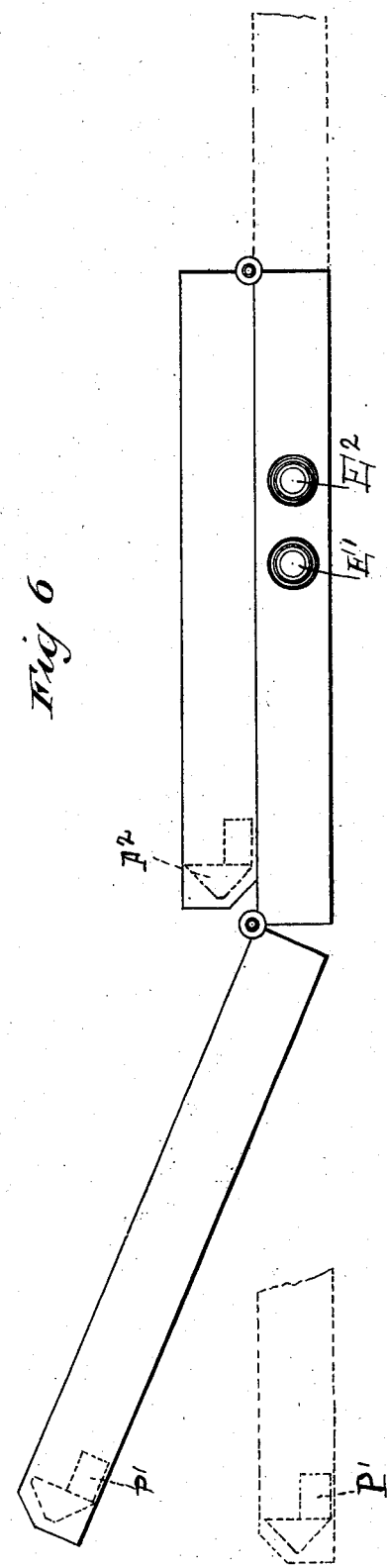
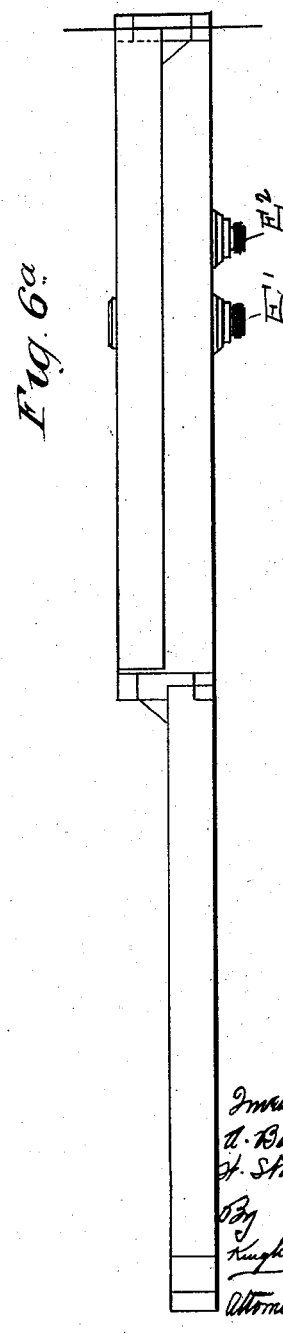

No. 739,475. Patented September 22, 1903.

UNITED STATES PATENT OFFICE.

ARCHIBALD BARR, OF GLASGOW, SCOTLAND, AND WILLIAM STROUD, OF LEEDS, ENGLAND.

RANGE-FINDER OR TELEMETER.

SPECIFICATION forming part of Letters Patent No. 739,475, dated September 22, 1903.

Application filed March 19, 1903. Serial No. 148,587. (No model.)

*To all whom it may concern:*

Be it known that we, ARCHIBALD BARR, professor of engineering in the University of Glasgow, in the city of Glasgow, Scotland, and WILLIAM STROUD, professor of physics in the Yorkshire College, Leeds, England, have invented certain new and useful Improvements in Range-Finders or Telemeters, of which the following is a specification.

Our invention relates to improvements in single-observer range-finders or telemeters of the type in which two partial images of the object viewed are brought into alinement or "coincidence" in the field of view of an eyepiece in operating the instrument.

In a range-finder embodying our present improvements small relative actions of any parts of the telescopic portion do not affect the relative position of the partial images in the direction of the base length as they appear in the field of view—i. e., do not affect what we call "coincidence." To accomplish this, one objective only is used to transmit the two beams (instead of two objectives, as is customary) in combination with a "separating-prism," which causes the partial images to appear separate and not overlapping.

A range-finder embodying our present improvements may be constructed in the manner described below and illustrated in the accompanying drawings.

Figure 1 is an elevation of the optical parts of our range-finder. Fig. 1$^a$ is a plan of the same. Fig. 2 is an elevation of the mechanisms for effecting the movement of the operating refractory prism D' and the scale S. Fig. 2$^a$ is a plan of the same. Fig. 2$^b$ is a front view of the fork F seen in Fig. 2. Fig. 2$^c$ is a section through the scale-drum S and shaft K, Fig. 2. Fig. 3 is an elevation of a mechanism for effecting the "halving adjustment." Fig. 3$^a$ is a plan of the same. Figs. 4 and 4$^a$ are respectively an elevation and plan of an "astigmatizing-gear." Figs. 5 and 5$^a$ are respectively an elevation and a plan of a complete instrument embodying our invention. Figs. 6 and 6$^a$ are respectively a side and a plan view of Fig. 5, showing the end portions hinged and folded upon the central portion.

P' and P$^2$ are compound end reflectors constituting optical squares.

O is an objective, rectangular in form.

R is a right-angled prism acting by two reflections, as shown, as a "returning-prism," receiving the beam of light from the end reflector P$^2$ and reversing its direction, so as to cause it to pass through the objective O in the same general direction as that taken by the beam from the end reflector P'. As will be seen from Fig. 1, one of the beams passes through the upper half of the objective O, the other through the lower half.

Q is a right-angled reflecting-prism, one transmitting-face of which has in the front of it, cemented to it or formed upon it, a prism of small angle acting as a separating-prism to divide the partial images from each other. The prism Q is so placed that the separating edge E is in the focal plane of the objective O, so that the partial images of an object formed by light entering and reflected by the end reflectors P' and P$^2$ are situated in the plane of the separating edge. To avoid confusion in the diagram, only the central beams of light are shown in Figs. 1 and 1$^a$. An eyepiece E$^2$, Fig. 1$^a$, is used to view the images and the separating edge. One of the lenses of the eyepiece may conveniently be cemented to or formed upon the second transmitting-face of the prism Q, as shown in the figure.

D' and D$^2$ are two "reflecting-prisms." One of these prisms—say D'—is used as the operating part of the optical system by being translated along the beam forming one of the partial images in conformity with the motion of the scale. The other prism D$^2$ may be provided with means for translating it along the path of the other beam and so be used as an adjusting-prism.

The optical combination here illustrated has the property that motion of the various parts other than the deflecting-prisms does not affect the relative positions of the partial images in respect to coincidence.

Figs. 2 and 2$^a$ represent in elevation and plan the mechanisms for effecting the movement of the operating refracting-prism D' and the scale S. The scale is graduated in spiral form on a drum which is caused to revolve by operation of the working head H, accessible to the hand through an aperture in the tube or case of the instrument. The holder M, which carries the refracting-prism D', is carried at N on the sleeve L, which forms a nut on the screw K', and is prevented from rotating with the screw by a fork F, attached to the nut N and engaging with a rod G, carried by the tube or frame-piece of the instrument, as shown in Fig. 2$^b$. The scale-drum S is free to rotate relatively to the nut, but is constrained to move longitudinally with it, as shown at J in Fig. 2. The scale-drum at its other end is feathered to the screw-shaft K, so as to be constrained to rotate with it, but to be free to slide along it, as shown in Fig. 2$^c$.

It will be evident that when the working head H is rotated the refracting-prism D' will be caused to move longitudinally and the scale-drum to rotate with but also to move longitudinally relatively to the shaft K. If, then, the spiral on which the scale is cut has the same pitch as the screw L, but the opposite hand, it will move so as to carry the successive divisions of the scale past a fixed index "I." The scale may be so arranged as to be viewed through an eyepiece E' by the left eye after the partial images have been brought into coincidence in the field of view of the right eyepiece E$^2$, as indicated in the drawings, Figs. 5 and 5$^a$.

The operation of the instrument is as follows: When a distant object—a flagpole, for instance—is viewed through the instrument, it is seen partly above and partly below the separating edge, which appears as a thin black line across the center of the field. The partial images will (usually) not appear in true alinement or coincidence, but one will be to the right of the other. When the working head H is rotated and the prism D' is consequently translated, one of the partial images (the lower one in the arrangement shown) is moved, and the scale is so graduated that when the partial images are brought into alinement—i. e., when they show a continuous pole—the graduation on the scale which is opposite the index-mark "I" will indicate the distance of the pole from the instrument in yards or other unit.

We may use other means for effecting the coincidence of the partial images; but we prefer the refracting-prism method. We may use a straight scale instead of the spiral scale.

A lever U, which is supported from the tube or frame-piece of the instrument by means of a spring V, carries the prism R by means of a suitable holder and is actuated at its other end by a screw of fine pitch operated by a toothed head W. When the head W is rotated, the prism R is angled about a horizontal axis, and this causes the partial image of the object viewed formed by light traversing the end reflector P$^2$ and the prism R, to move up or down relatively to the partial image formed by light traversing the end reflector P', and thus the halving adjustment may be effected—i. e., one of the partial images may be moved vertically relatively to the other, so that when in alinement the partial images will form a complete image and not show duplication nor deficiency.

X is a plane cylindrical lens, through which both beams pass. When the lens is close up to the separating edge E, it produces no appreciable effect upon the images; but when by means of a motion of the lever Y (placed outside the tube of the instrument) the astigmatic lens is carried to some distance from the separating edge—that is, to some distance from the focal plane of the objective—the partial images are astigmatized—i. e., they are drawn out vertically. By this means the observation is facilitated in the case of an object that is too small or of too irregular a shape to be easily observed upon its natural form.

Instead of reflecting-prisms of the type shown at P' and P$^2$ we may use reflecting-prisms of any other known type that constitute optical squares, or we may use two plain mirrors fixed at forty-five degrees to each other in the form of the ordinary optical square. In this instrument the end portions are hinged to the central portion for compactness in carriage, as indicated in Figs. 6 and 6$^a$. This is not essential. The whole of the parts may be mounted in one continuous tube, or, again, the end portions may be made to come off for convenience in carriage, or, again, the end portions may be arranged to slide or "telescope" onto the central portion. This is rendered possible without derangement of the coincidence adjustment by the use of compound reflectors forming optical squares at each end of the base. The central portion may conveniently be made in the form of a box, with a bottom removable for giving access to the working parts of the instrument. At the ends of the central portion windows may be fitted, as indicated in Figs. 5 and 5$^a$, to exclude dust or moisture when the parts are folded over. Windows may also be fitted at the inner ends of the end portions.

We claim—

1. A single-observer range-finder comprising a compound reflector constituting an optical square at each end of the base, a returning-prism, a single objective to transmit the two beams, and a separating-prism, substantially as described and illustrated on the accompanying sheets of drawings.

2. A single-observer range-finder comprising a spiral scale which is rotated and translated by the operating mechanism of the instrument so as to indicate the range at a fixed index-mark placed within the tube or case of the instrument and arranged to be read by one eye when the observation has been made by the other eye, substantially as described and illustrated on the accompanying sheets of drawings.

3. A single-observer range-finder comprising a base-tube or frame-piece formed in two or more parts, so as to be capable of being folded, or otherwise packed into a more convenient form when out of use, and having compound reflectors constituting optical squares at each end of the base, substantially as described and illustrated on the accompanying sheets of drawings.

In testimony whereof we have hereunto affixed our signatures in presence of two witnesses.

ARCHIBALD BARR.
WILLIAM STROUD.

Witnesses:
JOHN LIDDLE,
AGNES MACKINTOSH.